United States Patent [19]
Sakai

[11] Patent Number: 6,068,409
[45] Date of Patent: May 30, 2000

[54] SYNTHETIC RESIN CAGE FOR ROLLER BEARING

[75] Inventor: Kentarou Sakai, Hamura, Japan

[73] Assignee: Koyo Seiko Co., Ltd., Osaka, Japan

[21] Appl. No.: 09/199,568

[22] Filed: Nov. 25, 1998

[30] Foreign Application Priority Data

Dec. 1, 1997 [JP] Japan .................................. 9-343649

[51] Int. Cl.[7] .................................................. F16C 33/46
[52] U.S. Cl. ........................... 384/580; 384/470; 384/572
[58] Field of Search .................................... 384/470, 572, 384/576, 580

[56] References Cited

U.S. PATENT DOCUMENTS

| | | | |
|---|---|---|---|
| 1,668,112 | 5/1928 | Gibbons | 384/580 |
| 5,647,674 | 7/1997 | Ohashi et al. | 384/580 |
| 5,772,338 | 6/1998 | Hillmann et al. | 384/470 |

FOREIGN PATENT DOCUMENTS

| | | |
|---|---|---|
| 7-103240 | 4/1995 | Japan . |
| 9-79268 | 3/1997 | Japan . |

*Primary Examiner*—Thomas R. Hannon
*Attorney, Agent, or Firm*—Armstrong, Westerman, Hattori, McLeland & Naughton

[57] ABSTRACT

In a synthetic roller-bearing cage, axially separated annular bodies are connected by columnar portions arranged in the circumferential direction in order to define roller accommodating pockets. A radially outer surface of the columnar portion forms a portion of a cylindrical surface whose radius is smaller than that of the outer circumferential surfaces of the annular bodies, thus forming a lubrication-oil flow surface. A radially inner surface of the columnar portion, together with inner circumferential surfaces of the annular bodies, forms a portion of a cylindrical surface whose diameter is at least 30% that of the roller greater than that of a shaft on which the roller bearing is mounted. Grooved portions are formed in the circumferentially opposite side surfaces of the columnar portion at axially opposite end regions adjacent to the respective annular bodies. An outer roller-retaining portion having a pawl-like appearance is formed on either circumferential edge of a radially outer surface of the columnar portion at a region between the opposite grooved portions. Inner roller-retaining portions are formed on either circumferential edge of a radially inner surface of the columnar portion at axially opposite end regions located between and adjacent to the respective opposite grooved portions, so that a central receded portion is formed between the inner roller-retaining portions.

2 Claims, 1 Drawing Sheet

6,068,409

SYNTHETIC RESIN CAGE FOR ROLLER BEARING

BACKGROUND OF THE INVENTION

1. Field of the Invention

The present invention relates to a synthetic resin cage for a roller bearing.

2. Description of the Related Art

Conventionally, a synthetic resin cage for a roller bearing includes a cylindrical body made of a synthetic resin. A number of pockets for accommodating respective rollers are formed in the cylindrical body and arranged in the circumferential direction of the cylindrical body at predetermined intervals. A columnar portion is formed in the cylindrical body so as to separate adjacent pockets from each other. In other words, in the cage, two annular bodies axially separated from each other are integrally connected by a number of columnar portions arranged in the circumferential direction of the cage at predetermined intervals. Each pocket is defined by the opposite annular bodies and the adjacent columnar portions.

FIG. 3 shows an example of such a conventional synthetic resin cage for a roller bearing (see Japanese Patent Application Laid-Open (kokai) No. 9-79268).

In the cage 1 of FIG. 3, a radially outer surface of a columnar portion 3 is a portion of a cylindrical surface which is in parallel with the outer circumferential surface of a cylindrical body of the cage 1. A radially inner surface 5 of the columnar portion 3 is a portion of the inner circumferential surface of the cylindrical body. Circumferentially opposite side surfaces of the columnar portion 3 extend along the axial direction of the cage 1 and are substantially in parallel with the radial centerlines of the corresponding pockets (see FIG. 2).

Axially opposite end regions 20 of the radially outer surface of the columnar portion 3 adjacent to respective annular bodies 4 are portions of a cylindrical surface whose radius is appropriately smaller than that of the outer circumferential surface of the cylindrical body, or that of the outer circumferential surfaces of the annular bodies 4. The outer circumferential surfaces of the annular bodies 4 serve as guide surfaces for the cage 1. A central region 21 of the radially outer surface of the columnar portion 3 located between the axially opposite end regions 20 is a portion of a cylindrical surface whose radius is appropriately smaller than that of the axially opposite end regions 20, and serves as a surface of a passageway for lubrication oil.

Grooved portions 7 are formed in the circumferentially opposite side surfaces of the columnar portion 3 at axially opposite end regions, which correspond to the axially opposite end regions 20. Accordingly, the thickness of the columnar portion 3 as measured circumferentially at the grooved portions 7 is thinner than that as measured at the other regions of the columnar portion 3.

Auxiliary roller-retaining portions 22 are formed on either circumferential edge of the radially outer surface of the columnar portion 3 at axially opposite end portions of the central region 21 in such a manner as to project toward the pocket. An outer roller-retaining portion 23 is formed on either circumferential edge of the radially outer surface of the columnar portion 3 in such a manner as to be located between and axially separated from the auxiliary roller-retaining portions 22 by an appropriate distance.

The outer roller-retaining portion 23 projects toward the pocket and radially outward and projects more than do the auxiliary roller-retaining portions 22.

An inner roller-retaining portion 24 is formed on either circumferential edge of the radially inner surface of the columnar portion 3 in such a manner as to project toward the pocket and to extend between the grooved portions 7. The inner roller-retaining portion 24 projects less than does the outer roller-retaining portion 23.

The roller bearing of FIG. 3 supports a gear G on a shaft S such that the gear G is rotatable about the shaft S. In the roller bearing, each roller R is accommodated within a respective pocket of the cage 1. The shaft S is fitted into a hole defined by the thus-annularly-arranged rollers R, which, in turn, are fitted into a shaft hole D of the gear G.

A lubrication oil feed hole P is formed in the shaft S along its axis and communicates with an oil discharge hole Q which opens onto the exterior of the shaft S at an axially center position of the cage 1.

Next will be described a flow of lubrication oil within the roller bearing during rotation of the gear G about the shaft S.

Lubrication oil is fed from external lubrication oil feed means into the lubrication oil feed hole P formed in the shaft S. The thus-fed lubrication oil is discharged to the interior side of the roller bearing through the oil discharge hole Q by virtue of a centrifugal force.

Thus, the lubrication oil is fed onto the circumferential surface of each roller R which is rolling on the surface of the shaft S. Due to blockage by the inner roller-retaining portion 24, the lubrication oil flows into each pocket making a detour via the grooved portions 7 located at the axially opposite sides of the inner roller-retaining portion 24, and reaches the central region 21 of the radially outer surface of the columnar portion 3 and then the shaft hole D of the gear G. After lubricating the surface of the shaft S, the circumferential surface of each roller R, and the shaft hole D of the rotating gear G, the lubrication oil flows out to the exterior of the roller bearing through gaps between the outer circumferential surfaces of the annular bodies 4 and the surface of the shaft hole D.

As described above, in the conventional synthetic resin cage for a roller bearing, lubrication oil fed from the external lubrication oil feed means flows into the interior side of the roller bearing via the lubrication oil feed hole P and the oil discharge hole Q of the shaft S. Within the roller bearing, due to blockage by the inner roller-retaining portion 24, the lubrication oil flows into each pocket making a detour via the grooved portions 7 located at the axially opposite sides of the inner roller-retaining portion 24, and reaches the central region 21 of the radially outer surface of the columnar portion 3 and then the shaft hole D of the gear G. After reaching the central region 21 of the radially outer surface of the columnar portion 3, the lubrication oil flows into gaps which are formed at the opposite end regions 20 and which are narrower than the gap formed at the central region 21. The lubrication oil then flows out to the exterior of the roller bearing through the gaps between the outer circumferential surfaces of the annular bodies 4 and the surface of the shaft hole D.

Accordingly, the flow of the lubrication oil within the roller bearing is not smooth. As a result, wear particles and dust which has entered into the roller bearing are not sufficiently discharged to the exterior of the roller bearing. Thus, such a roller bearing raises a problem when applied to gears and like components of construction and agricultural machinery used in dusty environments.

SUMMARY OF THE INVENTION

In view of the foregoing, an object of the present invention is to provide a synthetic resin cage for a roller bearing which permits smooth oil flow therethrough and satisfactorily discharge to the exterior of the roller bearing wear particles and dust which has entered thereinto.

To achieve the above object, the present invention provides a synthetic resin cage for a roller bearing which is formed of a synthetic resin such that annular bodies separated from each other in the axial direction of the cage are integrally connected by columnar portions arranged in the circumferential direction of the cage at predetermined intervals. A pocket is defined by the opposite annular bodies and the adjacent columnar portions for accommodation of a roller. A radially outer surface of the columnar portion is a portion of a cylindrical surface which is in parallel with outer circumferential surfaces of the annular bodies, which serve as guide surfaces for the cage, and whose radius is appropriately smaller than that of the outer circumferential surfaces of the annular bodies, thus forming a surface of a passageway for lubrication oil extending over the entire axial length of the columnar portion. A radially inner surface of the columnar portion, together with inner circumferential surfaces of the annular bodies, is a portion of a cylindrical surface whose diameter is at least 30% that of the roller greater than that of a shaft on which the roller bearing is mounted. Circumferentially opposite side surfaces of the columnar portion are substantially in parallel with the radial centerlines of the corresponding pockets. Grooved portions are formed in the circumferentially opposite side surfaces of the columnar portion at axially opposite end regions adjacent to the respective annular bodies.

An outer roller-retaining portion having a pawl-like appearance is formed on each of circumferentially opposite edges of a radially outer surface of the columnar portion at a region located between the opposite grooved portions in such a manner as to project toward a pocket and radially outward to such a degree as not to project beyond the annular bodies. A surface of the outer roller-retaining portion which faces the pocket is slanted with respect to the side surface of the columnar portion. Inner roller-retaining portions are formed on each of circumferentially opposite edges of a radially inner surface of the columnar portion at axially opposite end regions located between and adjacent to the respective opposite grooved portions in such a manner as to project toward the pocket. A central receded portion is accordingly formed between the inner roller-retaining portions.

In the synthetic resin cage of the present invention for a roller bearing, lubrication oil which is fed from external lubrication oil feed means into a lubrication oil feed hole formed in the shaft is discharged into a sufficiently large space defined by the roller bearing and the shaft (the gap between an inner circumferential surface of the cage and the surface of the shaft is at least 15% the diameter of a roller). Passing through the central receded portion located between the inner roller-retaining portions, the lubrication oil fed onto the circumferential surface of each roller rolling on the surface of the shaft readily flows into a pocket and then flows out to the radially outer surface of the columnar portion. Also, the lubrication oil fed into a gap between the radially inner surface of the columnar portion and the surface of the shaft flows into the grooved portions formed in the columnar portion and then flows out to the radially outer surface of the columnar portion.

After lubricating the surface of the shaft, the circumferential surface of each roller, and the shaft hole of a rotating body, the lubrication oil flows out to the exterior of the roller bearing through gaps between the outer circumferential surfaces of the annular bodies and the surface of the shaft hole. As compared to the case of a roller bearing using a conventional cage, the lubrication oil flows more smoothly because of a larger oil passageway and fewer obstacles. Thus, the cage of the present invention is suitably applicable to roller bearings for gears and like components of construction and agricultural machinery used in dusty environments.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF PREFERRED EMBODIMENT

An embodiment of the present invention will next be described in detail with reference to the drawings.

Figure 1:
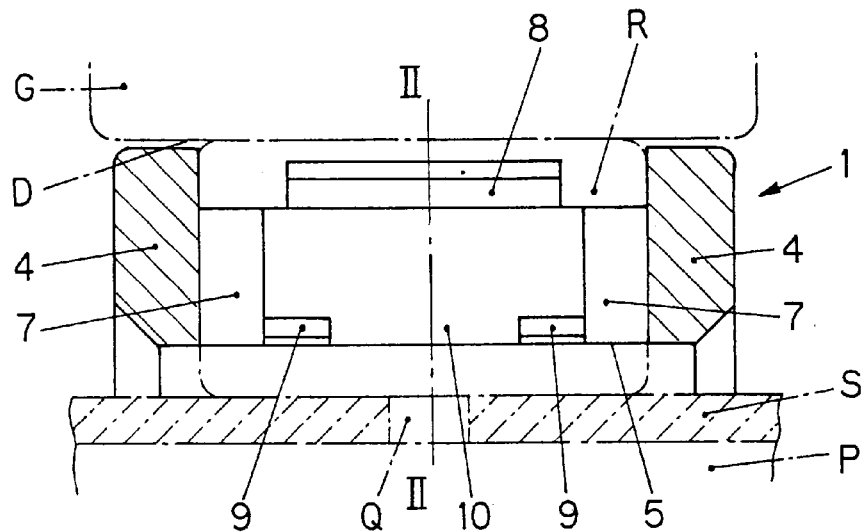
FIG. 1 is a sectional view of a synthetic resin cage for a roller bearing according to an embodiment of the present invention.

As shown in FIG. 1, a synthetic resin cage 1 for a roller bearing includes a cylindrical body made of an NRB resin. A number of pockets 2 for accommodating respective rollers R are formed in the cylindrical body and arranged in the circumferential direction of the cylindrical body at predetermined intervals. A columnar portion 3 is formed in the cylindrical body so as to separate adjacent pockets 2 from each other. In other words, in the cage 1, two annular bodies 4 separated from each other in the axial direction of the cage 1 are integrally connected by a number of columnar portions 3 arranged in the circumferential direction of the cage 1 at predetermined intervals. Each pocket 2 is defined by the opposite annular bodies 4 and the adjacent columnar portions 3.

A radially outer surface of the columnar portion 3 is a portion of a cylindrical surface which is in parallel with the outer circumferential surface of the cylindrical body, i.e., the outer circumferential surfaces of the annular bodies 4 and whose radius is appropriately smaller than that of the outer circumferential surfaces of the annular bodies 4. The outer circumferential surfaces of the annular bodies 4 serve as guide surfaces for the cage 1. The radially outer surface of the columnar portion 3 serves as a surface of a passageway for lubrication oil which extends over the entire axial length of the columnar portion 3.

Figure 2:
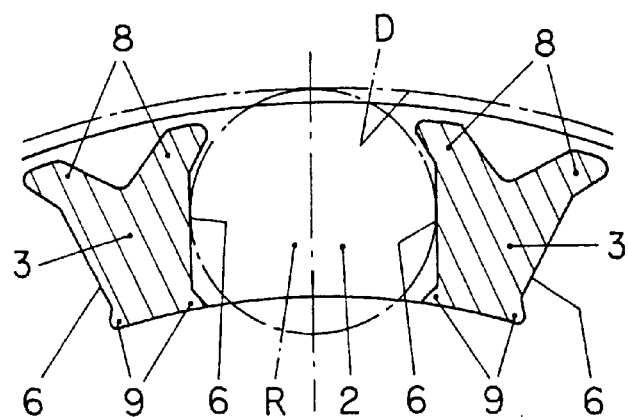
FIG. 2 is a partial sectional view taken along the line II—II of FIG. 1.
Figure 3:
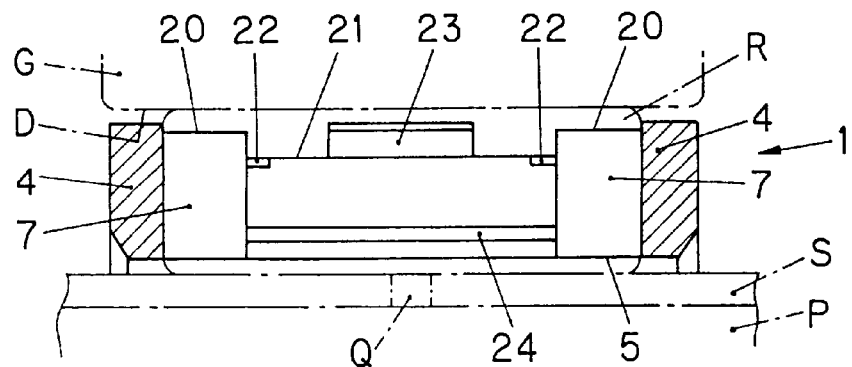
FIG. 3 is a sectional view of a conventional synthetic resin cage for a roller bearing.

A radially inner surface 5 of the columnar portion 3 is a portion of the inner circumferential surface of the cylindrical body. Circumferentially opposite side surfaces 6 of the columnar portion 3 extend along the axial direction of the cage 1 and are substantially in parallel with the radial centerlines of the corresponding pockets 2 as shown in FIG. 2. The outer circumferential surfaces of the annular bodies 4, serving as the guide surfaces for the cage 1, are appropriately smaller in diameter than a shaft hole D of a gear G or a like rotational body supported by the roller bearing. Thus, the cage 1 is guided by the shaft hole D.

Grooved portions 7 are formed in the circumferentially opposite side surfaces 6 of the columnar portion 3 at axially opposite end regions adjacent to the respective annular bodies 4. Accordingly, the thickness of the columnar portion 3 as measured circumferentially at the grooved portions 7 is thinner than that as measured at the other regions of the columnar portion 3.

As shown in FIG. 2, an outer roller-retaining portion 8 having a pawl-like appearance is formed on each of circumferentially opposite edges of the radially outer surface of the columnar portion 3 at a region located between the opposite grooved portions 7 in such a manner as to project toward the pocket 2 and radially outward to such a degree as not to project beyond the annular bodies 4. The surface of the outer roller-retaining portion which faces the pocket 2 is slanted with respect to the side surface 6 of the columnar portion 3.

The pawl-like appearance of the outer roller-retaining portions 8 facilitates the radially outward release of portions of a mold corresponding to the pockets 2 in a mold release step of a plastic working process for manufacturing the cage 1 through use of a synthetic resin.

Inner roller-retaining portions 9 are formed on each of circumferentially opposite edges of the radially inner surface of the columnar portion 3 at axially opposite end regions located between and adjacent to the respective opposite grooved portions 7 in such a manner as to project toward the pocket 2. A central receded portion 10 is accordingly formed between the inner roller-retaining portions 9. The inner roller-retaining portion 9 projects less than does the outer roller-retaining portion 8.

The roller bearing of FIG. 1 supports the gear G on the shaft S such that the gear G is rotatable about the shaft S. In the roller bearing, each roller R is accommodated within a respective pocket 2 of the cage 1. The shaft S is fitted into a hole defined by the thus-annularly-arranged rollers R, which, in turn, are fitted into the shaft hole D of the gear G. Since the diameter of the inner circumferential surface of the cage 1, including the radially inner surface of the columnar portion 3, is at least 30% that of the roller R greater than the diameter of the shaft S, there is formed a gap of at least 15% the diameter of the roller R between the inner circumferential surface of the cage 1 and the surface of the shaft S.

Also, since the radially outermost regions of the outer roller-retaining portions 8 and the outer circumferential surface of the cage 1 including the annular bodies 4 are appropriately smaller in diameter than the shaft hole D of the gear G, there is formed a gap between the radially outermost regions and the shaft hole D and between the outer circumferential surface and the shaft hole D.

A lubrication oil feed hole P is formed in the shaft S along its axis and communicates with an oil discharge hole Q which opens onto the exterior of the shaft S at an axially center position of the cage 1.

Next will be described a flow of lubrication oil within the roller bearing during rotation of the gear G about the shaft S.

Lubrication oil is fed from external lubrication oil feed means into the lubrication oil feed hole P formed in the shaft S. The thus-fed lubrication oil is discharged to the interior side of the roller bearing through the oil discharge hole Q by virtue of a centrifugal force.

Thus, the lubrication oil is fed onto the circumferential surface of each roller R which is rolling on the surface of the shaft S. Passing through the central receded portion 10 located between the inner roller-retaining portions 9, the lubrication oil flows through a gap between the side surface of the columnar portion 3 and the circumferential surface of the roller R and flows axially along the inner surface of the outer roller-retaining portion 8. After flowing out from the axially opposite ends of the outer roller-retaining portion 8, the lubrication oil reaches the shaft hole D of the gear G. In addition, the lubrication oil fed into a gap between the radially inner surface of the columnar portion 3 and the surface of the shaft S flows into the grooved portions 7 and then flows out to the radially outer surface of the columnar portion 3, thus reaching the shaft hole D of the gear G.

After lubricating the surface of the shaft S, the circumferential surface of each roller R, and the shaft hole D of the rotating gear G, the lubrication oil flows out to the exterior of the roller bearing through gaps between the outer circumferential surfaces of the annular bodies 4 and the surface of the shaft hole D.

In addition to the lubricating action described above, the lubrication oil discharges to the exterior of the roller bearing wear particles which have been generated in association with rotation of the gear G, and dust which has entered into the roller bearing.

Obviously, numerous modifications and variations of the present invention are possible in light of the above teachings. It is therefore to be understood that within the scope of the appended claims, the present invention may be practiced otherwise than as specifically described herein.

What is claimed is:

1. A synthetic resin cage for a roller bearing which is formed of a synthetic resin such that annular bodies separated from each other in the axial direction of the cage are integrally connected by columnar portions arranged in the circumferential direction of the cage at predetermined intervals in order to define pockets for accommodating rollers, wherein a radially outer surface of said columnar portion forms a portion of a cylindrical surface which is in parallel with outer circumferential surfaces of said annular bodies, which serve as guide surfaces for the cage, and whose radius is appropriately smaller than that of the outer circumferential surfaces of said annular bodies, thus forming a surface of a passageway for lubrication oil extending over the entire axial length of said columnar portion; a radially inner surface of said columnar portion, together with inner circumferential surfaces of said annular bodies, forms a portion of a cylindrical surface; and circumferentially opposite side surfaces of said columnar portion are substantially in parallel with the radial centerlines of said corresponding pockets;

grooved portions are formed in the circumferentially opposite side surfaces of said columnar portion at axially opposite end regions adjacent to said respective annular bodies;

an outer roller-retaining portion having a pawl-like appearance is formed on each of circumferentially opposite edges of a radially outer surface of said columnar portion at a region located between said opposite grooved portions in such a manner as to project toward said pocket and radially outward to such a degree as not to project beyond said annular bodies; and a surface of said outer roller-retaining portion which faces said pocket is slanted with respect to the side surface of said columnar portion; and inner roller-retaining portions are formed on each of circumferentially opposite edges of a radially inner surface of said columnar portion at axially opposite end regions located between and adjacent to said respective opposite grooved portions in such a manner as to project toward said pocket, so that a central receded portion is formed between said inner roller-retaining portions.

2. A synthetic resin cage for a roller bearing according to claim 1, wherein the radially inner surface of said columnar portion and the inner circumferential surfaces of said annular bodies form a portion of a cylindrical surface having a diameter which is at least 30% that of said roller greater than that of a shaft on which said roller bearing is mounted.

* * * * *